United States Patent [19]

Michelson

[11] Patent Number: 4,529,381

[45] Date of Patent: Jul. 16, 1985

[54] RADIATION SHIELD AND METHOD FOR SHIELDING A FURNACE CONVECTION SECTION

[75] Inventor: Herbert D. Michelson, Fort Lee, N.J.

[73] Assignee: Exxon Research & Engineering Co., Florham Park, N.J.

[21] Appl. No.: 523,001

[22] Filed: Aug. 15, 1983

[51] Int. Cl.[3] .......................... F27B 7/00; F27D 7/00; B01D 1/00

[52] U.S. Cl. .................................... 432/194; 196/100; 432/65; 432/226; 432/249

[58] Field of Search ................. 432/65, 194, 226, 249; 196/110

[56] References Cited

U.S. PATENT DOCUMENTS

| | | | |
|---|---|---|---|
| 1,079,266 | 11/1913 | Rockwell | 432/65 |
| 1,177,816 | 4/1916 | Sampson et al. | 196/110 |
| 1,678,126 | 7/1928 | Schoonmaker, Jr. | 196/110 |
| 1,709,016 | 4/1929 | Hendricks | 196/110 |
| 1,948,440 | 2/1934 | Crossland | 432/194 |
| 2,147,609 | 2/1939 | Reed et al. | 196/110 |
| 2,212,565 | 8/1940 | Kaasa | 196/110 |
| 3,671,198 | 6/1972 | Wallace | 165/154 |

*Primary Examiner*—John J. Camby
*Attorney, Agent, or Firm*—R. Yablonsky

[57] ABSTRACT

Apparatus and method for substantially blocking the "line-of-sight" between a radiant section of a furnace and a convection section positioned above the radiant section, while at the same time permitting flue gases from the radiant section to travel substantially freely through the shield. The shield may be composed of a plurality of staggered bodies. In a preferred embodiment the bodies are staggered plates, composed of insulating material. The staggered plates are supported by hangers that are hung from convection tubes in the convection section. In another embodiment the staggered bodies are tubes or rods.

56 Claims, 9 Drawing Figures

RADIATION SHIELD AND METHOD FOR SHIELDING A FURNACE CONVECTION SECTION

BACKGROUND OF THE INVENTION

1. Field of the Invention

This invention relates to a radiation shield and method for shielding an object, such as a convection section of a furnace, from radiant energy emitted by a radiant energy source, such as a radiant section of a furnace.

2. Description of Prior Art

One important modern industrial process relates to the rapid heating of essentially saturated hydrocarbons, such as ethane, propane, naphtha or gas oil to produce less saturated products, such as ethylene, propylene, butadiene, acetylene, etc. One method that is used to heat these saturated hydrocarbons is to burn a fuel; use the hot flue gases given off by the combustion of the fuel to preheat the saturated hydrocarbons; and then heat the hydrocarbons through the cracking range in close proximity to the burning fuel.

This method, commonly referred to as "steam cracking", has typically been effected by supplying the feedstock in vaporized or unvaporized form, in admixture with substantial amounts of steam, to suitable rows of tubes, known as "coils", in a cracking furnace. It is conventional to pass this reaction mixture through a number of parallel coils which pass through a convection section of the cracking furnace wherein the hot flue gas given off by the combustion of the fuel raises the temperature of the reaction mixture to some point below cracking temperature. The reaction mixture then passes through coils in a radiant section of the cracking furnace wherein burners supply the heat necessary, substantially in the form of radiant energy, to bring the reactants to the desired reaction cracking temperature and effect the desired reaction.

One problem that has imposed constraints on modern designs of steam cracking furnaces is that the convection section will "drain" or "steal" radiant energy from the radiant section to the extent that the radiant section is in the direct "line-of-sight" of the convection section. To compensate for this lost energy, additional fuel must be burned to maintain the desired temperatures in the radiant section. Of course, the greater the "field of view" between the radiant and convection sections, the greater the extent of this radiation absorption by the convection section.

Various designs have been proposed to reduce this undesirable effect, such as that disclosed in the patent to Wallace, U.S. Pat. No. 3,671,198. In Wallace the convection section is offset to the side of the radiant section to reduce or eliminate the extent to which the convection section is in direct "line-of-sight" of the radiant section so that a reduced amount of the radiant heat reaches the convection section.

Another proposed solution is to raise and separate the convection section sufficiently above the radiant section so that a long flue gas passage that connects the two sections can be used to significantly narrow the "field of view" between the two sections and thus physically shield the convection section from radiant heat given off by the radiant section.

These solutions, however, increase the cost and size of the furnace by requiring the convection section to be physically separated from the radiant section.

Thus, there is a need for a furnace which substantially reduces or eliminates the loss of radiant heat from the radiant section to the convection section, but is nevertheless simple in design.

SUMMARY OF THE INVENTION

It is an object of the invention to provide a furnace having a convection section closely associated with the radiant section but which nevertheless substantially reduces or eliminates the loss of radiant heat from the radiant section to the convection section that would otherwise result from this close association.

It is a further object of the invention to provide a radiation shield and a method for shielding an object such as a convection section from the radiant energy emitted by a radiant energy source, while at the same time allowing for substantially free flow of gases through the radiation shield.

These and other objects are achieved by the furnace according to the invention which includes a radiant section, a convection section, and a radiation shield. Radiant heat and flue gas are generated in a radiant section by the combustion of fuel therein. This flue gas flows via a flow passage substantially freely into the convection section, which is positioned above the radiant section. The radiation shield is disposed between the radiant section and the convection section so as to substantially block the "line-of-sight" or "field of view" between the radiant section and the convection section, thereby shielding the convection section from radiant energy emitted by the radiant section. The convection section is positioned above the radiant section and is preferably not offset therefrom.

The shield preferably does not occupy more than 75% of the cross section of the flow path at any level, i.e., at each level preferably at least 25% of the flow passage is open. The shield may be present in the form of a series of rows in which case no single row occupies more than 75% of the cross section such that the flow passage is preferably at least 25% is open.

The radiation shield, in one embodiment, comprises a plurality of staggered bodies. Each of the staggered bodies is supported by the convection section. The bodies are supported by hanging means for hanging the staggered bodies from the convection section. The hanging means comprises at least one hanger having a hook-shaped end adapted to hook onto and to hang from the tubes of the convection section.

In one embodiment the staggered bodies are plates to which the other ends of the hangers are adapted to be attached. The plates have openings therein which are adapted to engage the hanger at different positions along its length down to its free end. Each plate is supported by two pairs of hangers, with each pair of hangers being supported by a different convection tube.

In an alternative embodiment each hanging means comprises a hanger having two ends and an intermediate portion. Each of the ends is adapted to support at least one of the staggered bodies and the intermediate portion is adapted to be hung over the tubes of the convection section such that each convection tube supports at least one of the staggered bodies. Each convection tube is adapted to support at least one hanger and each staggered body is adapted to be supported by the two ends of one of the hangers.

In this embodiment, the staggered bodies may be plates having two openings therein which engage the two ends of one of the hangers. Other openings may be provided to engage at least one other hanger. Each end of each hanger is threaded and includes a nut so that each end of the hanger extends through one of the openings in the plates and the nut is threaded on each end of the hanger against the plate so that the plate is firmly attached to the hanger. At least one hanger supports a plurality of plates and the plurality of plates are spaced along the length of the hanger, wherein each plate has two openings therein for engaging the ends of the hanger.

The above apparatus and method thus makes it possible to provide a furnace having a convection section closely associated with the radiant section but which nevertheless substantially reduces or eliminates the loss of radiant heat from the radiant section to the convection section that would otherwise result from this close association.

In still another embodiment the radiation shield includes a plurality of staggered bodies, each of which has a first portion, adapted to face the radiant section, and a second portion, adapted to face the convection section. When radiant energy from the radiant section strikes the first portion, a reduced amount of this energy is transmitted to the second portion and radiated toward the convection section. Each staggered body may comprise a plate whose first portion is a reflecting layer and whose second portion is an insulating layer, or whose first portion is an insulating layer and whose second portion is a reflective layer.

The radiation shield in another embodiment comprises at least one dummy tube. A "dummy tube" is a tube through which no process fluid flows. The tube has a first portion adapted to face the radiant section and a second portion adapted to face the convection section. The tube is cylindrical and thin-walled, and may have insulation material between the first and second portions.

Alternatively, or in addition to the dummy tubes, process tubes, carrying process fluid may be used as a radiation shield, as long as they are properly treated, e.g., covered with insulating or reflective material, e.g., chrome plating. The process tubes may be arranged in a staggered array between the convection and radiation sections.

Broadly speaking, the radiation shield which itself constitutes a unique aspect of the invention includes a plurality of staggered tubes, of such a size and so arranged so as to substantially block the "line of sight" between the radiant section and the convection section. The tubes are spaced from one another so that the total cross-sectional area of the flow passage along any row of tubes is preferably at least 25% open space between the tubes. The tubes are of such a size and are so positioned so as to be adapted to permit flue gas to travel substantially freely from the radiant section to the convection section.

The plurality of tubes may be distributed in one or more rows. When two or more rows are present the temperature of the furnace along the top row is less than the temperature at the bottom row, the differential increasing as a function of the number of rows present and the degree of staggering.

A first support supports the bottom row of tubes, and the bottom row of tubes may support the top row of tubes. The tubes may be spaced from one another by means of collar rings which provide for support but nevertheless allow for substantially free passage of the gas. Both the convection section and the two or more rows of tubes in this embodiment are mounted on top of the radiant section. As in the first embodiment, the tubes may be thin-walled and include a first portion, adapted to face the radiant portion; a second surface adapted to face the convection portion; and insulating material therebetween. When radiant energy from the radiant section strikes the first portion most of the energy reradiates back toward the radiant section and a reduced amount is transmitted to the second portion, and reaches the convection section. In alternative embodiments the tubes may be hollow, or may be replaced by rods composed of insulating material. The insulation material used may be fibrous kaolin, well known to those skilled in the art.

The invention also relates to a method of operating a furnace in which cracking of saturated hydrocarbons occurs in an efficient manner such that radiant heat is not drained by the convection section of the furnace. The method includes burning fuel in a radiant section of the furnace to produce radiant energy and flue gas; substantially blocking or obstructing the "line-of-sight" between the radiant section and the convection section located above the radiant section with a radiation shield to substantially reduce the amount of radiant energy generated in the radiant section from escaping to the convection section; and flowing the flue gas substantially freely through the shield, from the radiant section to the convection section.

The radiant energy may be flocked from reaching the convection section by a first row of spaced apart bodies. The radiant energy passing between the bodies in the first row is blocked from directly reaching the convection section by a second row of bodies, staggered with respect to the first row of bodies. Each body has a first portion facing the radiant section and a second surface facing the convection section. Radiant energy incident upon the first portion is blocked by each body and the second portion emits less than the amount of radiant energy incident upon the first portion. Furthermore, depending upon the structure of the staggered bodies, less than the total amount of radiation incident upon the first portion is transmitted to the second portion.

Once again, with the method of the invention the staggered bodies themselves may be in the form of tubes or plates as were described above, with portions thereof preferably comprising an insulation material such as fibrous kaolin.

The invention may be best understood from the following description when read in conjunction with the accompanying drawings.

DETAILED DESCRIPTION OF PREFERRED EMBODIMENTS

Prior art furnaces prevent the convection section from "stealing" radiant energy from the radiant section by offsetting the convection section to the side of the radiant section, as proposed by Wallace, U.S. Pat. No. 3,671,198.

The present invention also shields the convection section from the radiant section, but allows the convection section to be placed directly above the radiant section, thereby reducing the cost and size of the furnace, and permitting the flue gas to travel from the radiant section to the convection section substantially freely.

Figure 1:
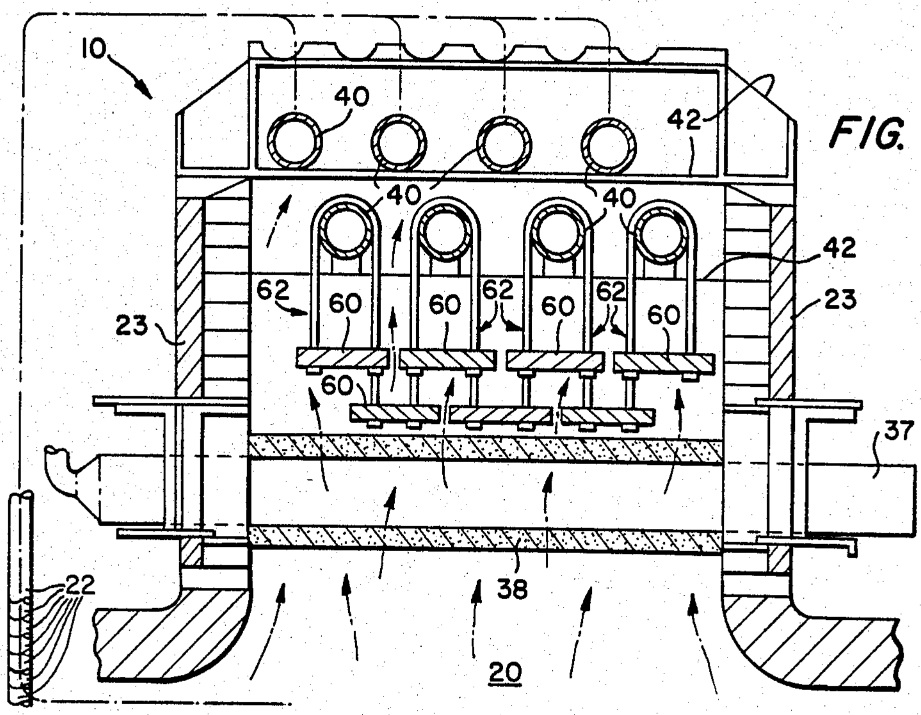
FIG. 1 is a cross-sectional view of a furnace having convection tubes mounted above a radiant section and shield plates mounted therebetween.
Figure 2:
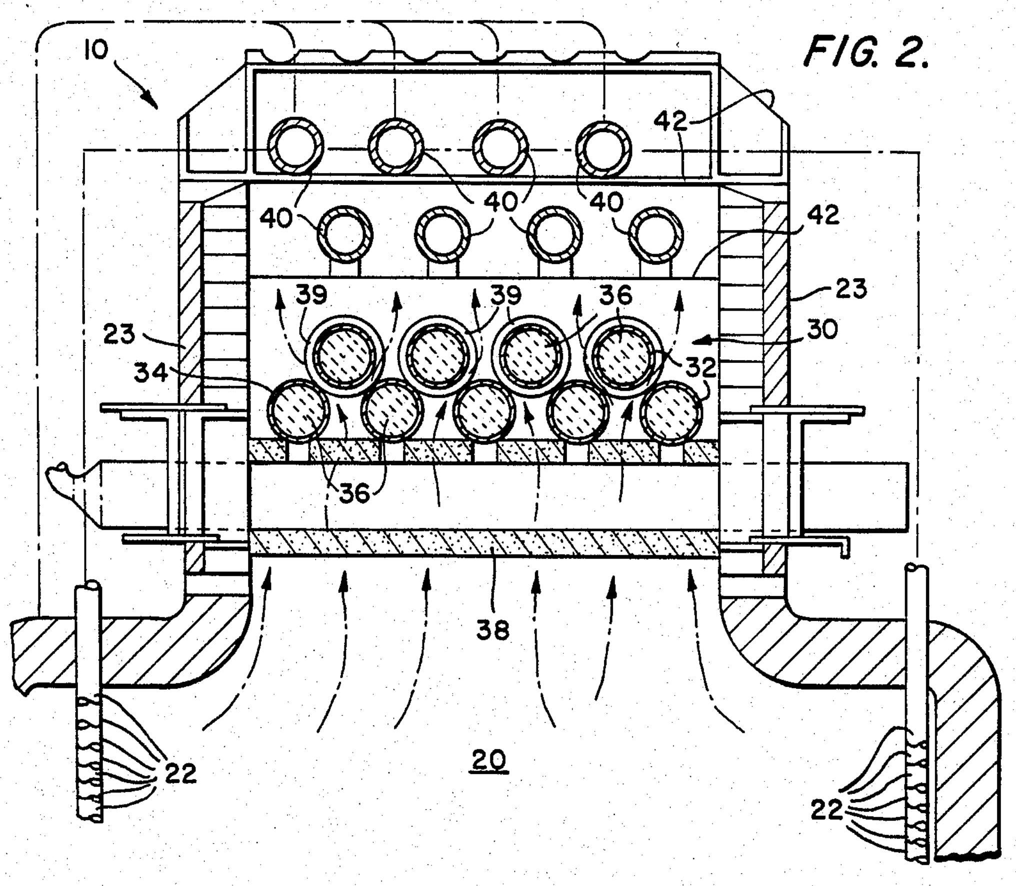
FIG. 2 is a cross-sectional view of the furnace having convection tubes mounted above a radiant section and dummy shield tubes mounted below the convection tubes.

The furnace of the present invention is shown in FIGS. 1 and 2. These Figures show a furnace 10 having a radiant section 20, which produces radiant energy and flue gas, and a convection section having convection tubes 40 extending above radiant section 20. FIGS. 1 and 2 illustrate a steam cracking furnace for producing olefins. However, the present invention can be used with other types of furnaces such as steam reformers and process heaters. Radiant section 20 is typically operated at coil outlet temperatures of 700°-900° C. The flue gases that are produced leave radiant section 20 at 1000°-1200° C.

Hydrocarbonaceous process fluid to be cracked flows through convection tubes 40. Here it is preheated by hot flue gases to some temperature just below the incipient cracking temperature. For example, for cracking ethane to ethylene, which has an incipient cracking temperature of about 1300° F., the process fluid is preheated to about 1050° F.-1200° F. Flue gases are represented by arrows in radiant section 20. Once the process fluid is pre-heated, it is conducted (as shown in dotted lines) to radiant tubes 22 in radiant section 20 to complete the cracking process. The process fluids may comprise hydrocarbons ranging from ethane to gas or oil, and even steam.

Convection tubes 40 are arranged in rows at various heights above radiant section 20. Although only two rows are shown in FIG. 1, additional rows of convection tubes can be provided. Tubes 40 are supported by tube supports 42. Supports 42 are, in turn, attached to the vertical walls 23 above radiation section 20. Vertical walls 23 enclose the convection section and rise above radiant section 20, and hold supports 42. Thus, convection tubes 40 are economically and compactly mounted on top of radiant section 20.

Although the close spacing of the convection and radiant sections is desirable for economic reasons, it would normally be impractical, because convection tubes 40 would "steal" or "drain" radiant energy from radiant section 20, thereby tending to lower the radiant heat density of radiant section 20, typically by 5-20%. This decrease in the radiant heat density of radiant section 20 requires the combustion of additional fuel to maintain a given radiant heat density.

In order to minimize the radiant heat loss from radiant section 20, while at the same time positioning convection tubes 40 close to radiant section 20, so as to receive combustion gases therefrom, a radiation shield 30 is inserted into a flow passage through which flue gases travel or flow from radiant section 20 to convection tubes 40. The radiation shield, to be effective, must perform several functions. First, it must allow flue gas to travel substantially freely from radiant section 20 to convection tubes 40. Second, it must minimize or prevent radiant heat present in radiant section 20, from reaching the radiant energy-absorbing surfaces in the convection section, e.g. tubes 40.

In order to minimize or prevent the radiant energy from reaching convection tubes 40, a shield is provided which substantially blocks the "line-of-sight" between the radiant section and convection section. "Line-of-signt" as it is used here is defined as the spatial relationship between the radiant and convection sections such that radiant energy travels in a straight line, without obstruction, from the radiant to the convection section. By substantially blocking the "line-of-sight" between the radiant and convection section, radiant energy is not directly incident upon convection tubes 40. The shield itself, of course, will heat up and re-radiate or reflect some radiant energy to convection tubes 40, but the amount of radiant energy incident upon convection tubes 40 by this process is substantially less than the amount of radiant energy that would reach tubes 40 without the obstruction of the "line-of-sight". Furthermore, in order to minimize the re-radiation of radiant energy, the shield may comprise insulating material, such as fibrous kaolin. Because insulating material is a poor heat conductor, only a fraction of the total amount of radiant energy incident upon and absorbed by the portion of the shield facing the radiant section will be transmitted to and emitted from the portion of the shield facing the convection section. Although insulating material such as kaolin is the preferred material for the shield, some advantage will be achieved using almost any material, such that even reflective or conducting material may be used for the shield to some advantage. As long as the "line-of-sight" is substantially blocked, the radiant energy "drained" by convection tubes 40 will be reduced.

Blocking the "line-of-sight" alone, however, is not sufficient for the invention to achieve its dual purposes; the invention must also permit flue gases to travel substantially freely from radiant section 20 to the convection section. To accomplish this goal, the shield may preferably comprise a plurality of staggered bodies, staggered in the direction of the flow of the flue gas. The bodies comprise at least two rows in which the bodies are spaced apart. The bodies in the second row are positioned between the bodies in the first row.

The bodies in the second row are sufficiently large and are so spaced that substantially all of the radiant energy passing between the bodies in the first row is blocked by the bodies in the second row. Alternatively, there may be many rows of staggered bodies so that a portion of radiant energy emitted by radiant section 20 is not blocked until it reaches the last row; as long as the last row blocks substantially all of the radiant energy travelling between bodies in the other rows, the invention will produce its desired effect.

The bodies in the second row are spaced from the bodies in the first row in the direction of the gas flow, so that flue gas can flow between the bodies in the first and second rows. The cross-sectional area of the flow passage connecting the radiant and convection sections along any row of the shield is sufficient to permit substantially free gas flow, and, in one embodiment, is preferably at least 25% open. Of course it is possible to use only one row of bodies. Such an embodiment would reduce to some extent the draining of radiant energy by the convection section, although not as efficiently as two staggered rows. When two or more rows are used, the spacing of the rows from one another is obviously an important consideration, and should again be selected so as to permit the relatively free flow of the flue gases through the shield.

Figure 3:
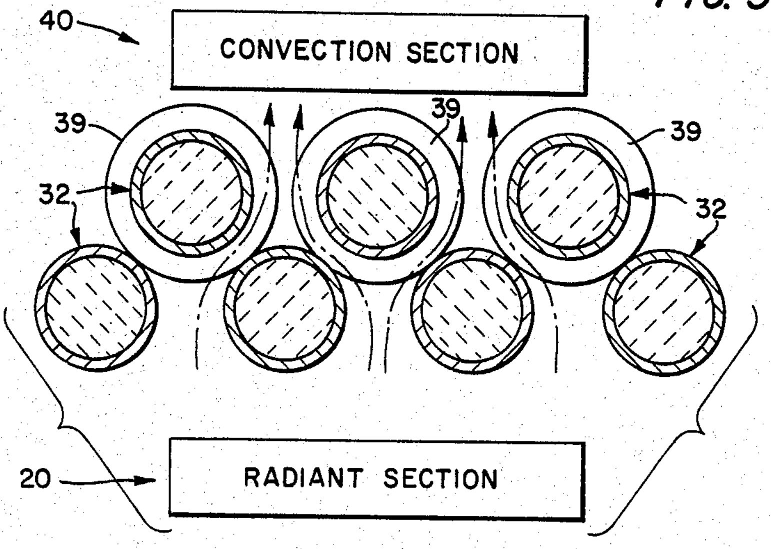
FIG. 3 is a cross-sectional view of shield tubes and their collars, disposed between the radiant section and the convection section (shown schematically)
Figure 6:
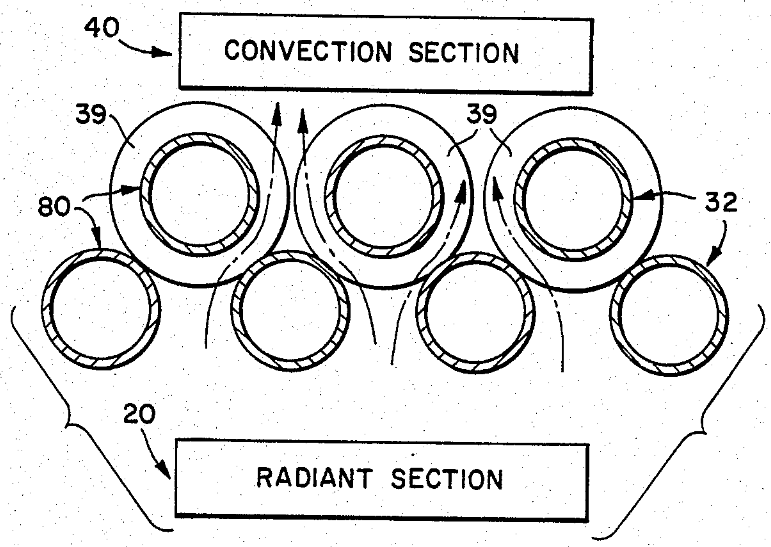
FIG. 6 is a cross-sectional view of another embodiment of the shield tubes, which are hollow and positioned between the convection and radiant sections (shown schematically)
Figure 7:
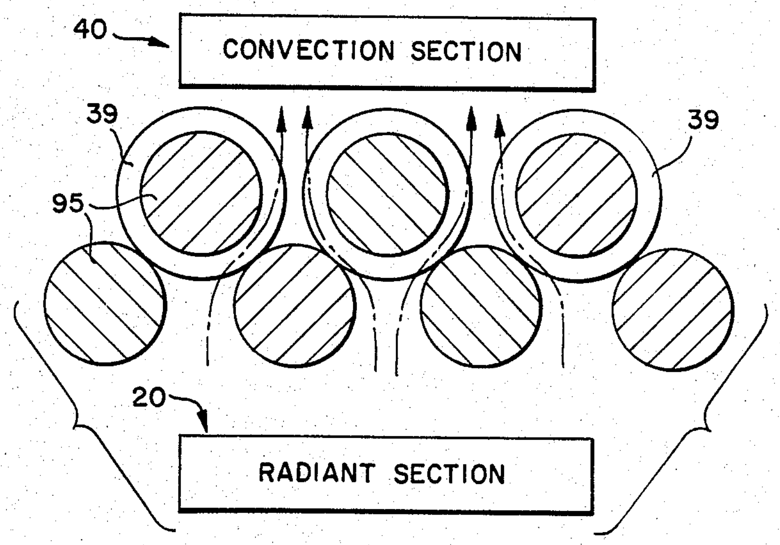
FIG. 7 is a cross-sectional view of shield rods which are disposed between the convection and radiant sections (shown schematically)
Figure 8:
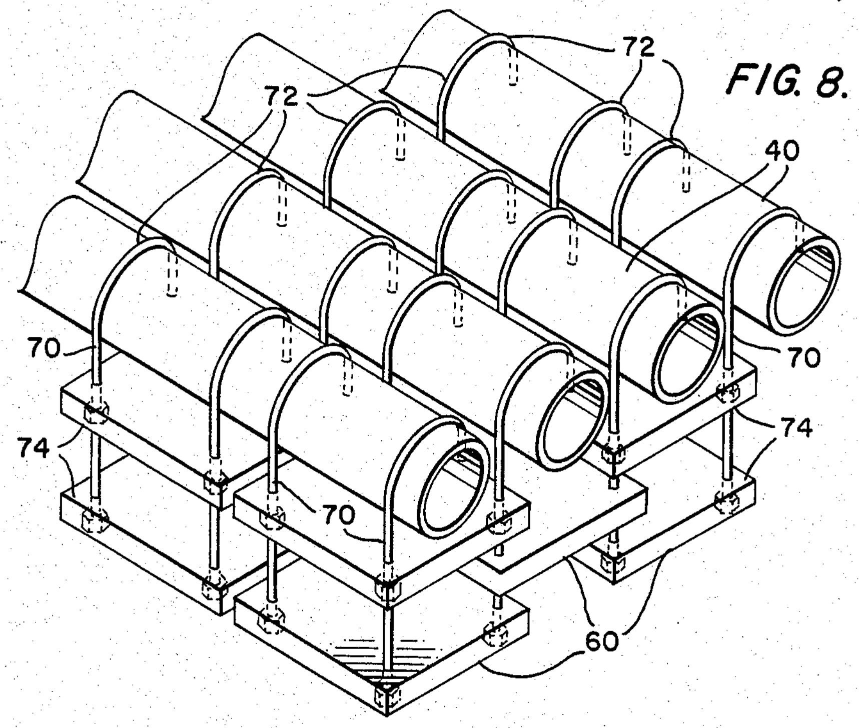
FIG. 8 is a perspective view of shield plates which are supported by hangers attached to the convection tubes.
Figure 9:
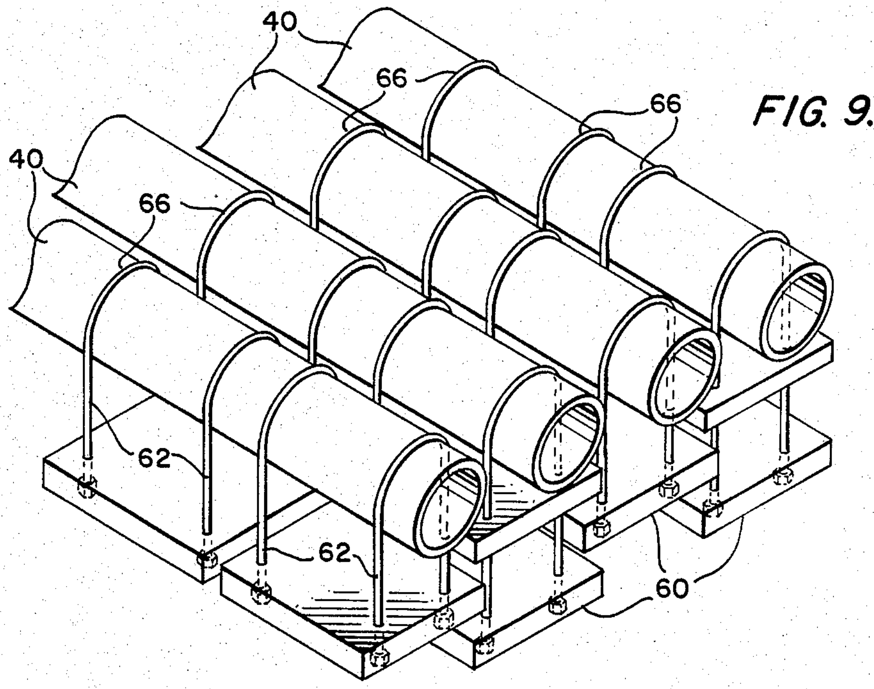
FIG. 9 is a cross-sectional view of another embodiment of the hangers for supporting the shield plates from the convection tubes.

In a preferred embodiment, the shield bodies comprise plates 60 of kaolin board, as seen in FIGS. 1, 8 and 9. Alternatively, the plates may combine an insulating and reflective metal layer, as seen in plates 50 in FIG. 4. In other embodiments, the bodies comprise thin-walled tubes 32 having insulation therein (FIGS. 3 and 5), hollow tubes 80 of insulating material (FIG. 6), or rods 95 comprising insulating material (FIG. 7). Other shapes for the bodies can be used, and it is also within the scope of the present invention to use a grid having scrapings thereon as the shield.

The preferred embodiment, shown in FIGS. 1, 8 and 9, includes two rows of staggered plates 60, staggered in the direction of the flow of flue gas. The preferred means for supporting plates 60 are hangers which support plates 60 from the convection section. Alternatively, plates 60 may be supported by beam 37.

In the embodiment disclosed in FIG. 1 and more clearly seen in FIG. 9, hangers 62 have two ends and an intermediate section 66 therebetween. The ends of each hanger are threaded and are adapted to pass through openings in at least one plate 60 and are secured thereto by a nut. Intermediate section 66 is hung over and supported by the top of a convection tube 40. As seen in FIG. 9 each plate is supported by two hangers which are supported by the same tube 40, and several hangers are long enough to support two plates in different rows. It is also within the scope of the invention for each hanger to support plates in three or more rows. Typically, the plates are 12" wide, 24–36" long, and they are spaced on levels 4" apart.

Alternatively, each plate 60 could be supported by a plurality of hangers which are attached to different convection tubes. Such an embodiment is illustrated in FIG. 8. In FIG. 8, hangers 70 have one hook-shaped end 72, hooked around the top of a convection tube 40 to support a plate 60 attached to the other end 74 thereof. Each plate 60 has an opening therein adapted to receive threaded end 74 of hanger 72. A nut is threaded on end 74 to firmly attach plates 40 to hangers 70. Each plate is supported by two pairs of hangers 70, and each pair of hangers is supported by a different convection tube 40. In addition, each hanger supports at least two plates in different rows.

Figure 5:
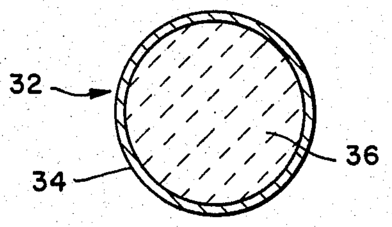
FIG. 5 is a cross-sectional view of one of the shield tubes having insulating material therein.

In another embodiment, radiation shield 30 comprises, as shown in FIG. 2, two staggered rows of shield tubes or "dummy" tubes 32. Each tube 32 is shown as a cylinder, having a thin wall 34 of thin cross-section, and is preferably filled with lightweight insulation 36 as seen in FIG. 5, such as kaolin. Alternatively, tubes 32 could be replaced by hollow tubes 80 (FIG. 6) or solid rods 95 (FIG. 7). The bottom row is supported on a regular or air-cooled support beam 37, having insulation 38 therearound, and the top row is supported by spacing collars 39, which rest on the bottom row. When rods 95 or hollow tubes 80 are used, spacing collars 39 can also be used, as seen in FIGS. 7 and 6, respectively. Alternatively, the top row could be supported by support bars resting on the bottom row, or both rows could be hung from convection tubes 40, as in the first embodiment. The two rows are staggered in the direction of the flow of the flue gas so as to substantially block the "line-of-sight" between convection tubes 40 and radiant section 20. At the same time, this staggered arrangement allows flue gas to flow around tubes 32 to reach convection tubes 40 substantially freely. Collars 39 are preferably spaced along the length of the top row of tubes 32 such that there is sufficient space between the top and bottom rows of tubes, as seen in FIG. 2, to permit flue gases to flow therearound. The arrows seen in FIGS. 1 and 2 represent flue gas that passes from radiant section 20, around tubes 32, to convection tubes 40, and out of the top of the furnace.

The thin walls 34 of tubes 32 may be made of high temperature resistant stainless steel, and insulating material 36 inside tubes 32 may be composed of fibrous kaolin. Preferred thicknesses of the thin wall of the tube are on the order of about ⅛ to ¼". The preferred diameter of tubes 32 is about 4"–8"; these tubes extend the length of the furnace. Collars 39 can be composed of stainless steel, and typically have a diameter 2–4" larger than the tube.

When radiant energy is emitted from radiant section 20, a portion of it is absorbed by the bottom portion of the thin wall 34 of shield tubes 32, which portion faces radiant section 20. The bottom portion of thin wall 34 heats up and transmits the absorbed heat to the surroundings in two ways. First, the bottom portion of thin wall 34 conducts heat to insulating material 36, and around its circumference. Insulation material 36 does not conduct heat well, and, therefore, transmits substantially less than the total amount of heat or radiant energy incident upon its bottom portion, across its length, width and height. Thus, the top portion of thin wall 34 faces convection tubes 40 on the other side of shield tube 32, and receives substantially less than the total amount of heat or radiant energy incident on the bottom portion by conduction through insulation 36.

In addition, the bottom portion of thin wall 34 also conducts heat along its circumference to the top portion of thin wall 34. However, because thin wall 34 is thin there is little material available to conduct the heat around its circumference to the top portion that faces convection tubes 40. Consequently, the top portion of thin wall 34 receives substantially less than the total amount of heat incident upon the bottom portion by conduction around the circumference of thin wall 34.

In addition to conduction, the bottom portion of thin wall 34 also transmits radiant energy by radiation. As the radiant energy from radiant section 20 is absorbed by the bottom portion of thin wall 34, this portion heats up to a temperature at which the bottom portion re-radiates this radiant energy in all directions. The heat that re-radiates upwardly is absorbed by insulation 36, thereby effectively shielding both the top portion of thin wall 34 and the side portions of thin wall 34 from this heat. The heat that is re-radiated horizontally and downwardly does not reach either the top portion of thin wall 34, or convection tubes 40. Thus, when the bottom portion of thin wall 34 re-radiates radiant energy, only a fraction of this radiation reaches convection tubes 40.

Therefore, a reduced amount of radiant energy incident upon and absorbed by the bottom portion of shield tubes 32 is communicated to the top portion of the shield tubes. As a result, the top portion of thin wall 34 radiates substantially less than the total amount of radiant energy incident upon the bottom portion. In this way shield tubes 32 act as a shield, preventing radiation from radiant source 20 from being "stolen" by convection tubes 40. Furthermore, because shield tubes 32 are thin-walled, they do not conduct a large amount of heat themselves.

Although two staggered rows of tubes have been shown, other arrangements are possible, as long as convection section 40 is kept out of the direct "line-of-sight" of radiation section 20 as much as possible, and flue gas can travel substantially freely from radiant section 20 to convection section 40. For example, three or four staggered rows of tubes could be used. Also, tubes of different diameters can be used. It may also be possible, depending on the configuration of convection tubes 40, to use only one tube, as long as that tube effectively reduces the "line-of-sight" between convection tubes 40 and radiant section 20, and allows flue gas to pass therearound substantially freely.

Furthermore, the thin wall of tubes 32 need not be in the shape of a continuous cylinder. For example, the thin wall may only extend halfway up the tube. In another embodiment, the tube may comprise insulating material in the shape of a tube, with a thin wall only on the bottom surface of the tube facing radiant section 20. In addition, the tube need not even be in the shape of a cylinder. For example, the tube could be triangular-shaped, rectangular-shaped, or in the shape of an irregular, many-sided solid.

Figure 4:
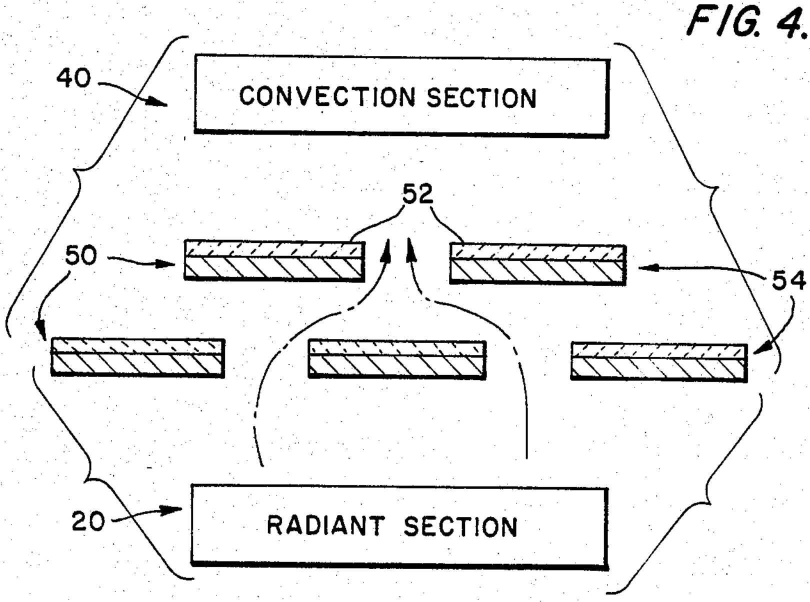
FIG. 4 is a cross-sectional view of shield plates having two layers, disposed between a radiant section and a convection section (shown schematically)

FIG. 4 shows an alternate arrangement, in which staggered shield plates 50 comprise an upper layer 52 composed of an insulating material such as a Kaolin fiber blanket, and a lower layer 54 of reflective metal, such as polished stainless steel.

Radiation emitted from radiant section 20 strikes the lower reflective metal layer of shield plate 50, and is reflected back to radiant section 20. As metal layer 54 heats up and re-radiates and conducts radiant energy upward, this energy is absorbed by the bottom portion of insulation layer 52 which faces reflecting layer 54. Insulation layer 52 is a poor conductor of heat or radiant energy. Thus, substantially less than the total amount of radiant energy incident upon layer 54 is conducted to the top portion of layer 52, which faces convection tubes 40. As a result, convection tubes 40 receive a reduced amount of radiation from radiant section 20. At the same time, because shield plates 50 are staggered, flue gas from radiant section 20 can reach convection tubes 40 substantially freely, as is illustrated by the arrows in FIG. 4.

The radiation shield can also function if the layers are reversed. When insulation layer 52 is on the bottom, its bottom portion absorbs the radiation from radiant section 20, and conducts substantially less than the total amount of radiant energy incident upon the bottom portion of layer 52 to its top portion which faces the bottom portion of reflective layer 54. Most of the radiation that reaches the bottom portion of reflecting layer 54 will be reflected back toward radiant section 20, into insulating layer 52 so that the top portion of reflecting layer 54 which faces convection tubes 40 radiates substantially less than the total amount of radiant energy incident upon the shield.

Other structures may also function as a radiation shield according to the invention. For example, an array of spheres having insulating material therein, or one multi-layered sheet having openings therein, that are located between convection tubes 40, so that tubes 40 are substantially out of the "line-of-sight" radiant section 20, could be used instead of plates or tubes.

The present invention can be used on any furnace in which it is desirable to minimize the loss of radiation from the radiant section, while at the same time allowing the flue gases to pass to the other side of the shield. In addition, the radiation shield of the present invention may be used in conjunction with home wood-burning stoves. When disposed between a structural wall and the stove, the shield will interfere with radiation losses to the wall, while simultaneously allowing cool room air to enter the space between the wall and the shield and become heated up, thereby further warming the room.

In another application, the radiation shield could be used in the smokestack of a furnace, in conjunction with a waste-heat recovery system. In waste-heat recovery systems, the heat from hot gases escaping from a furnace is transferred to a heat exchanger which carries the heat to a remote location to where the normally wasted heat is used for a variety of useful purposes. The radiation shield could be placed between the furnace and the heat exchanger to allow the hot gases to reach the heat exchanger while at the same time preventing the heat exchanger from draining any radiant energy from the stack.

The invention is not confined to the embodiments described and illustrated, and numerous modifications could be introduced without departing from the scope of the invention, which is defined and limited only by the claims.

What is claimed is:

1. A furnace comprising:

(a) a radiant section containing vertical process tubes, which produces radiant energy for heating a process fluid, and flue gas;

(b) a convection section containing convection tubes in which said process fluid is pre-heated, said convection section being positioned above said radiant section, and being not substantially offset from said radiant section;

(c) a flow passage therebetween for flue gas; and (d) a radiation shield comprising at least a first row and second row of staggered plates disposed in said flow passage so as to substantially block the "line-of-sight" between said radiant section and said convection section, the cross-sectional area of said flow passage across said shield being at least 25% open so that said flue gas flows substantially freely from said radiant section to said convection section.

2. The furnace of claim 1 wherein each of said staggered plates is supported from said convection section.

3. The furnace of claim 2 further comprising hanging means for hanging said staggered plates from said convection section.

4. The furnace of claim 3 wherein said hanging means comprises a hanger having a hook-shaped end adapted to hang at least one of said staggered bodies from said convection section.

5. The furnace of claim 4 wherein said convection section includes a plurality of convection tubes, and wherein the hook-shaped end of each of said hangers is hooked onto one of said convection tubes.

6. The furnace of claim 5 wherein each of said staggered bodies comprises a plate to which the other end of each of said hangers is attached.

7. The furnace of claim 6 wherein each of said plates has openings therein through which the other end of each of said hangers is inserted.

8. The furnace of claim 7 wherein each plate is supported by two pairs of hangers, and each pair of hangers for a given plate is supported by a different convection tube.

9. The furnace of claim 3 wherein each hanging means comprises a hanger having two ends and an intermediate portion, each of said ends supporting at least one of said staggered plates, said intermediate portion hanging around a convection tube.

10. The furnace of claim 9 wherein said intermediate portion of each hanger hangs from the top of one of said convection tubes so as to support at least one of said staggered plates.

11. The furnace of claim 10 wherein each of said convection tubes supports at least one hanger, and each staggered plate is supported by the two ends of one of said hangers.

12. The furnace of claim 1 wherein each of said plates has openings through which the two ends of one of said hangers extend.

13. The furnace of claim 12 wherein each end of said hangers is threaded and includes a nut at its two ends for firmly attaching each of said plates to one of said hangers.

14. The furnace of claim 12 wherein at least one hanger supports a plurality of plates along its length.

15. The furnace of claim 1 wherein each of said plates comprises a first portion, adapted to face said radiant section and a second portion adapted to face said convection section.

16. The furnace of claim 15 wherein said first portion comprises a reflecting layer and said second portion comprises an insulating layer.

17. The furnace of claim 15 wherein said first portion comprises an insulating layer, and said second portion comprises a reflecting layer.

18. The furnace of claim 1 wherein said convection section is disposed entirely above said radiant section.

19. The furnace of claim 1 wherein said radiation shield comprises at least one dummy tube.

20. The furnace of claim 19 wherein said dummy tube has a first portion adapted to face said radiant section, and a second portion adapted to face said convection section, and wherein said tube further comprises insulating material disposed between said first and second portions.

21. The furnace of claim 20 wherein said dummy tube is cylindrical and thin-walled.

22. The furnace of claim 19 wherein said radiation shield comprises a plurality of staggered dummy tubes of such a size and so arranged so as to substantially block the "line-of-sight" between said radiant section and said convection section.

23. The furnace of claim 22 wherein each of said staggered dummy tubes is hollow.

24. The furnace of claim 1 wherein said shield comprises a plurality of staggered rods.

25. A radiation shield for a furnace for insertion in a flow passage connecting a radiant section containing vertical process tubes, in which section flue gas is produced and a convection section containing convection tubes in which process fluid is pre-heated by said flue gas, said shield comprising at least a first row and second row of staggered plates adapted to be disposed in said flow passage so as to substantially block the "line-of-sight" between said radiant section and said convection section, the cross-sectional area of said flow passage across any level of said shield being at least 25% open whereby said flue gas flows substantially freely through said radiation shield when said shield is inserted into said flow passage.

26. The radiation shield of claim 25 wherein said staggered plates are at least partially formed of insulating material.

27. The radiation shield of claim 25 further comprising hanging means for hanging each of said staggered plates from said convection section.

28. The radiation shield of claim 21 wherein said hanging means comprises a hanger having one hook-shaped end adapted to be supported by said convection section.

29. The radiation shield of claim 28 wherein said staggered bodies are plates to which the other end of said hangers are adapted to be attached.

30. The radiation shield of claim 29 wherein each of said plates has openings therein adapted to engage the other end of said hanger.

31. The radiation shield of claim 30 wherein each of said plates is supported by two pairs of hangers, and wherein each pair of hangers is adapted to be supported by a different convection tube.

32. The radiation shield of claim 27 wherein each hanging means comprises a hanger having two ends and an intermediate portion, each of said ends being adapted to support at least one of said staggered plates, said intermediate portion being adapted to be hung from a convection tube.

33. The radiation shield of claim 32 wherein each staggered plate is adapted to be supported by the two ends of one of said hangers.

34. The radiation shield of claim 25 wherein said plates are composed of fibrous kaolin.

35. The radiation shield of claim 25 wherein each of said plates has two openings therein adapted to engage the two ends of one of said hangers.

36. The radiation shield of claim 35 wherein each of said hangers is adapted to support a plurality of plates.

37. The radiation shield of claim 36 wherein said plurality of plates are spaced apart along the length of said hanger.

38. The radiation shield of claim 25 wherein each plate has a first portion adapted to face said radiant section, and a second portion adapted to face said convection section.

39. The radiation shield of claim 38 wherein each of said staggered bodies is a thin-walled tube.

40. The radiation shield of claim 39 wherein each of said tubes further include insulating material disposed between said first and second portions.

41. The radiation shield of claim 38 wherein each of said staggered bodies is a plate, and wherein said first portion is reflective and said second portion comprises an insulating layer.

42. The radiation shield of claim 38 wherein each of said staggered bodies is a plate, and wherein said first portion is an insulating layer and said second portion is reflective.

43. A method of operating a furnace comprising a radiant section containing vertical process tubes, for generating radiant heat to heat a process fluid, and a flue gas; and a convection section containing convection tubes in which section said flue gas pre-heats said process fluid, said convection section being located above said radiant section with a flow passage therebetween, said method comprising the steps of:

(a) combusting fuel in said radiant section of said furnace to produce radiant energy and flue gas;

(b) substantially blocking the "line-of-sight" between said radiant section and said convection section with a radiation shield comprising at last a first row and second row of staggered plates, the cross-sectional area of said flow passage across said shield being at least 25% open; and (c) flowing said flue gas substantially freely through said shield from said radiant section to said convection section.

44. The method of claim 43 wherein each of said staggered plates comprises insulating material which minimizes the amount of radiant energy conducted through the body.

45. The method of claim 43 wherein said bodies are thin-walled tubes.

46. The method of claim 43 wherein said bodies comprise plates having a reflective portion facing said radiant section and an insulating portion facing said convection section.

47. The method of claim 43 wherein said bodies comprise plates having an insulating portion facing said radiant section and a reflective portion facing said convection section.

48. The furnace of claim 1 wherein said radiation shield comprises a plurality of process tubes through which said process fluid flows.

49. The furnace of claim 48 wherein said process tubes have a reflective outer layer.

50. The furnace of claim 48 wherein said process tubes have an insulating outer layer.

51. The method of claim 43 wherein said bodies are process tubes through which said process fluid flows from said convection section to said radiation section.

52. The method of claim 51 wherein each of said staggered bodies comprises an insulating outer layer.

53. The method of claim 51 wherein each of said staggered bodies comprises a reflective outer layer.

54. A furnace comprising:

(a) a radiation section containing vertical process tubes, which produces radiant energy for heating a process fluid, and flue gas;

(b) a convection section containing convection tubes in which said process fluid is pre-heated, said convection section being positioned above said radiant section and being not substantially offset from said radiant section; and (c) a radiation shield disposed between said radiant section and said convection section, comprising at least a first row and second row of staggered plates, rods or tubes, so as to substantially block the "line-of-sight" between said radiant section and said convection section, said flue gas flowing substantially freely from said radiant section to said convection section.

55. A radiation shield for a furnace for insertion in a flow passage connecting a radiant section containing vertical process tubes, in which section flue gas is produced and a convection section containing convection tubes in which process fluid is pre-heated by said flue gas, said radiation shield comprising at least a first row and second row of staggered plates, rods or tubes adapted to be disposed in said flow passage so as to substantially block the "line-of-sight" between said radiant section and said convection section, said flue gas flowing substantially freely through said radiation shield when said shield is inserted in said flow passage.

56. A method of operating a furnace comprising a radiant section containing vertical process tubes, for generating radiant heat to heat a process fluid, and a flue gas; and a convection section containing convection tubes in which section said flue gas pre-heats said process fluid, said convection section being located above said radiant section, said method comprising the steps of:

(a) combusting fuel in said radiant section of said furnace to produce radiant energy and flue gas;

(b) substantially blocking the "line-of-sight" between said radiant section and said convection section with a radiation shield comprising at least a first row and second row of staggered plates, rods or tubes; and (c) flowing said flue gas substantially freely through said shield from said radiant section to said convection section.

* * * * *